HIGH SPEED PARALLEL TYPE BINARY ELECTRONIC ADDER

Filed May 19, 1954 2 Sheets-Sheet 1

INVENTOR.
JOSEPH F. GENNA
ROBERT E. STALCUP
BY G. D. O'Brien
T. L. Styner ATTYS.

HIGH SPEED PARALLEL TYPE BINARY ELECTRONIC ADDER

Filed May 19, 1954 2 Sheets-Sheet 2

INVENTOR.
JOSEPH F. GENNA
ROBERT E. STALCUP
BY
ATTYS.

United States Patent Office 2,845,222

Patented July 29, 1958

2,845,222

HIGH SPEED PARALLEL TYPE BINARY ELECTRONIC ADDER

Joseph F. Genna and Robert E. Stalcup, Indianapolis, Ind., assignors to the United States of America as represented by the Secretary of the Navy Application May 19, 1954, Serial No. 431,014

8 Claims. (Cl. 235—61)

Figure 1:
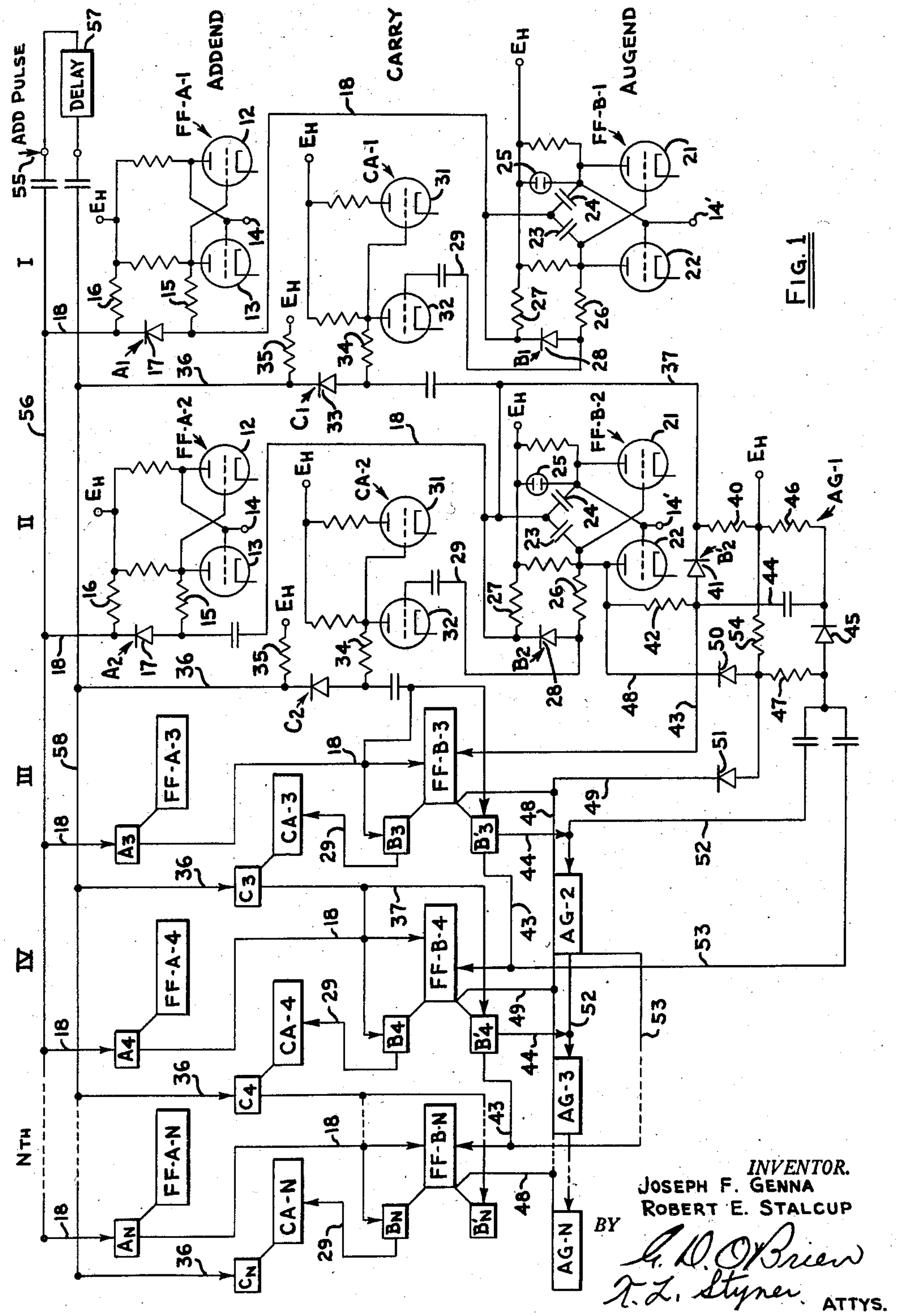

(Granted under Title 35, U. S. Code (1952), sec. 266)

The invention described herein may be manufactured and used by or for the Government of the United States of America for governmental purposes without the payment of any royalties thereon or therefor.

This invention relates to an electronic binary computing device and more particularly to a high speed parallel type binary electronic computer having reliable simplified interstage couplings wherein a minimum of parts are used producing a compact, small size, and light weight device for rapidly producing the addition of binary digits with the utmost accuracy.

Binary computers of well known designs comparable to the present invention have considerable bulk and weight in that it is necessary to match impedances, form the pulses, and use isolation means between the digital stages. In general, there are two types of binary computer devices for performing addition of binary numbers. In one type, addition, including all carries, is performed simultaneously or semi-simultaneously by the use of complicated diode matrices. The second type utilizes a procedure in which a pulse generated by the change of state of one unit is used to trigger another unit. In this second type time must be allowed for each individual carry which results from a previous carry. The time allowed for an N-digit adder is N pulse times. Those devices having simultaneous addition provide the desired speed but have a complex arrangement of logic circuits using diode matrices of complicated design composed of a large number of parts all of which increase the possibility of failure. The second-mentioned type of adder has definite limitations of speed. Since time must be allowed for many carries, the units making up such an adder must be able to change state very rapidly in order to attain a high speed of addition and, in general, the circuitry must be designed with a great amount of care. One circuit driving another requires some degree of isolation or impedance matching otherwise the wave shape suffers from loading effects.

In the present invention a reliable and accurate semi-simultaneous parallel type binary adder is provided with the need for impedance matching, pulse forming circuits, and isolation circuits between stages eliminated. The binary adder of this invention results in a substantial savings of parts and circuitry and is much less complicated in design and operation than many known binary adders. The digital components are of the well known or usual design of bi-stable and monostable flip-flop circuits as multivibrators wherein the bi-stable circuits are used in the addend and augend series and the monostable circuits are used in the carry units. Each digital stage including an addend and an augend bi-stable multivibrator and a monostable multivibrator is coupled to the next adjacent digital stage through simple gating circuits. The binary numbers to be added are pulsed into the addend series, the augend series, or both and an add pulse applied in parallel to all the gates controlled by the addend bi-stable units. A slightly delayed pulse, or the add pulse passed through a delay circuit, is applied in parallel to the gates of the carry units to add them into the sum. Simple investigating circuits control the gating of carries into the next higher order digit. This operation is extremely rapid to give immediate summations. The add pulse can be generated by a device specifically built for this purpose to trigger all units. The device is constructed of well known elements which provide a binary adder device with stable components and the power supply voltages and component values are not critical to the proper operation of the device. The clamping of voltages is unnecessary in this adder device wherein clamping circuit devices are eliminated which ordinarily have a relatively high failure rate when used. It is therefore a general object of this invention to provide a high speed parallel type binary electronic adder having digital stage couplings free of impedance matching, pulse forming, and isolation circuits between the stages.

Figure 2:
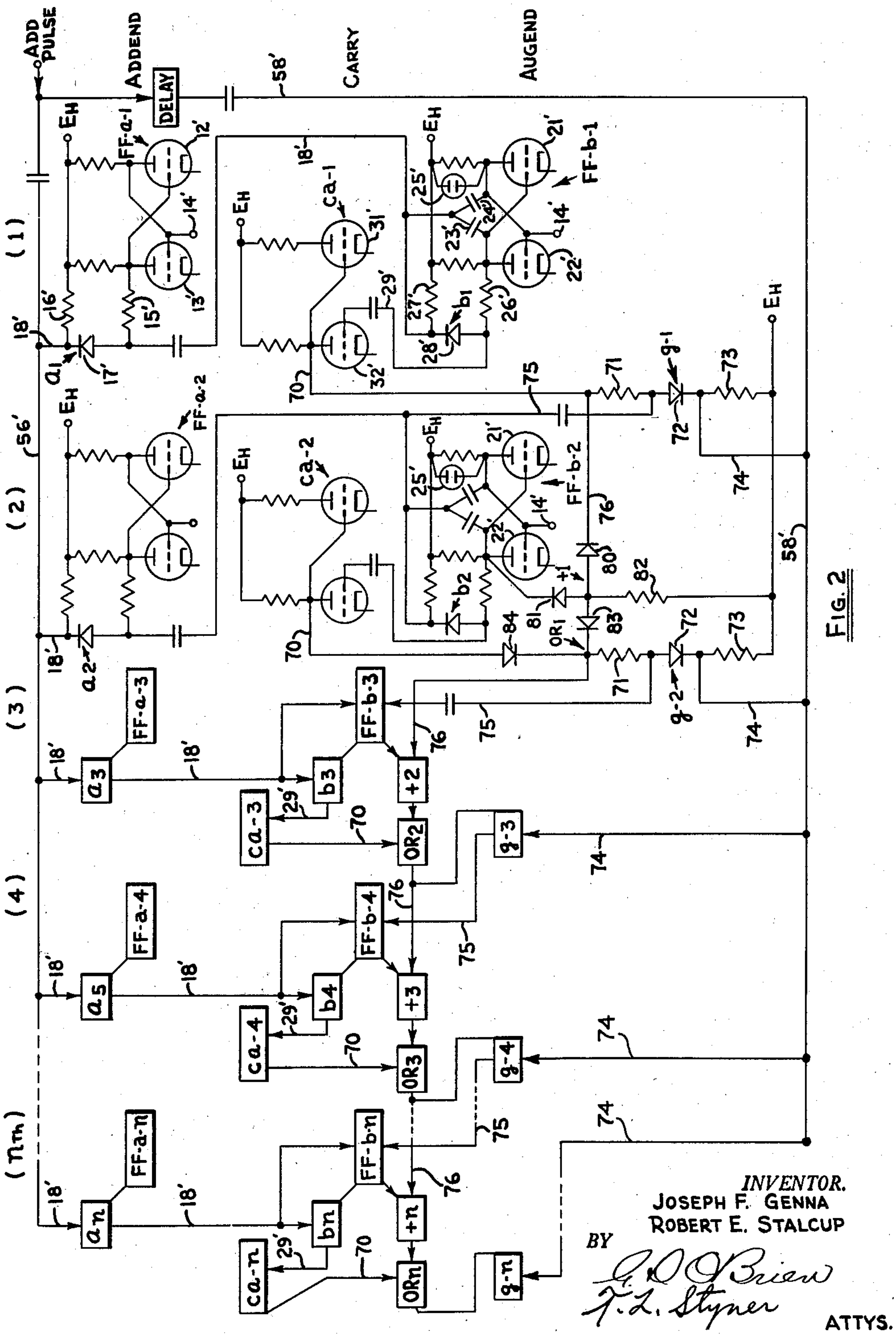

These and other objects, advantages, features, and uses will become more apparent as the description proceeds, when considered with the accompanying drawings in which:

Figure 1 is a diagram of one modification of the binary digital adder of this invention shown partly in schematic circuit and partly in block circuit, and Figure 2 is a diagram of another modification of the binary digital adder with parts thereof shown in schematic circuit and parts in block circuit.

Referring more particularly to Figure 1, there is illustrated a binary digital adder represented in a plurality of vertical adjacent and coupled stages in the drawing from right to left with the least significant digit on the right. These digital stages are represented by the Roman numerals I, II, III, and IV to the Nth stage. The top portions of the schematic and block circuits horizontally across the drawing represent the addend register and are indicated by the principal reference characters FF—A. The central portions of the digital stages horizontally across the drawing represent the carry units and are indicated by the principal reference characters CA. The lower portions of all digital stages horizontally across the drawing represent the augend register and are indicated by the principal reference characters FF—B.

The addend digital register unit FF—A in each digit consists of a bi-stable flip-flop circuit illustrated herein as being a bi-stable multivibrator circuit consisting of tubes 12 and 13 coupled in a high voltage direct current circuit $E_H$ with the anodes and grids interconnected in the well known manner. The grid of the left tube 13 has a terminal 14 thereon adaptable for coupling to a keying circuit (not shown) for the purpose of conditioning each addend multivibrator to make either tube 12 or 13 conductive. The multivibrator circuits are cleared in the well known manner as by applying a positive pulse to all terminals 14. By applying a negative pulse to the terminal 14 each multivibrator circuit can be conditioned to make tube 12 conductive. In the anode circuit of tube 13 across the anode load resistance are resistors 15 and 16 which have the ends thereof connected through a diode 17. The resistors 15 and 16 and the diode 17 constitute a gate represented in general by the principal reference character A. A conductor 18 is connected through the diode 17. When the tube 13 is conducting the voltage in its anode circuit will be low thereby closing the gate through the diode 17. Upon tripping the multivibrator circuit through the terminal 14 to make tube 12 conductive and tube 13 non-conductive, the voltage in the anode circuit of tube 13 will be high thereby opening the gate in the diode 17. As hereinafter referred to, when tube 13 is non-conductive and tube 12 conductive, the multivibrator circuit will be said to lie in its "1" state; and likewise, when tube 13 is conductive and tube 12 is non-conductive the multivibrator circuit will be said to lie in its "0" state.

The augend register unit FF—B in earh digit is comprised of a bi-stable flip-flop circuit represented herein as a bi-stable multi-vibrator consisting of tubes 21 and 22 coupled in a high voltage direct current circuit $E_H$ with the anodes and grids inter-connected in the ordinary manner of these multivibrator circuits. The conductor 18 out from the A gate is connected to the couplings of each anode-to-grid circuit through condensers 23 and 24. An indicator neon tube 25 is connected across the anode load resistor of tube 21 for the purpose hereinafter to be described. In the anode circuit of tube 22 are resistors 26 and 27 connected at opposite points across the anode load resistance having the opposite ends thereof coupled across a diode 28. The conductor 18 is connected at the input of the diode 28 and the conductor 29 is connected to the output of the diode 28. The resistors 26 and 27 and the diode 28 constitute a gate circuit represented by the principal reference character B. This augend multivibrator circuit is cleared in the same manner as the addend by applying a positive pulse to the terminal 14'. When tube 22 is conducting the multivibrator circuit FF—B will be said to lie in its "0" state; and conversely, when tube 22 is non-conductive the multivibrator circuit will be said to lie in its "1" state, at which time the glow tube 25 will be lighted for the purpose hereinafter made clear.

The carry register unit CA in each digital stage is illustrated as a monostable circuit herein particularly shown as a monostable multivibrator consisting of tubes 31 and 32 coupled in a high coltage $E_H$ direct current circuit with the anode of tube 32 coupled to the grid of tube 31 in a manner well understood in the art. The grid of tube 32 is coupled to the conductor 29 from the output of the gate circuit B. The anode circuit of tube 32 is coupled to a gate, indicated by the principal reference character C, consisting of a diode 33, a resistor 34, and a resistor 35. The resistor 35 is connected to a high direct current voltage $E_H$. Conductor 36 connects the input of the gate C and a conductor 37 connects the output of the gate C. When the tube 32 is conducting the anode voltage thereof will be low thereby closing the gate through the diode 33. This condition of the carry multivibrator circuit CA is the "0" state. Upon a negative pulse arriving via conductor 29, tube 32 will be rendered non-conductive in which its anode voltage will be high thereby opening the gate through the diode 33. This condition of the carry multivibrator circuit CA is the "1" state. Each carry unit CA being a monostable multivibrator will return to its "0" state after a short period of time.

The conductor 37 of carry unit CA–1, for example, is coupled to the common grid input of the augend multivibrator FF–B–2 in the second digital stage through the condensers 23 and 24 and also to a gate of the next higher digit represented by the principal reference character $B'_2$. The gate circuit $B'_2$ consists of a resistor 40 coupled to a high voltage direct current circuit $E_H$, a diode 41, and a resistor 42 coupled to the anode circuit of tube 22 in digital stage II. The output of the gate $B'_2$ is connected through a conductor 43 to the common grid input of the augend multivibrator circuit in digital stage III represented by the principal reference character FF–B–3. That is, gate $C_1$ of carry unit CA–1 is connected to the augend register unit FF–B–2 and to the gate $B'_2$ and the output of gate $B'_2$ is connected to the augend register unit FF–B–3, and so on through the digital series. The output of the gate $B'_2$ is also connected through a conductor to the input of an "and-gate" circuit, represented by the principal reference character AG–1, consisting of a diode 45, a resistor 46 coupled to a high voltage $E_H$ circuit, and a resistor 47 coupled through a conductor 48 to the anode circuit of tube 22 in digital stage II. The "and-gate" circuit AG–1 is also coupled to the anode circuit of the tube 22 in the augend multivibrator FF–B–3 through the conductor 49. The conductors 48 and 49 each have diodes 50 and 51, respectively, therein constituting an "and-circuit" consisting of diodes 50, 51, and a resistor 54. The output of the first "and-gate" circuit AG–1, for example, is connected to the input of the next "and-gate" AG–2 in series through conductor 52 and is also connected through a conductor 53 to the common grid input of the augend multivibrator FF–B–4. An "and gate" is a gate controlled by an "and circuit." Succeeding stages are coupled as described above.

An add pulse enters by way of conductor 55 and is transmitted over conductor 56 connecting each of the conductors 18. The add pulse is also coupled by a conductor through a delay circuit 57 of any general and well known design, the output thereof being on a conductor 58 connected to each of the conductors 36. The digital stages II, III, and IV are all identical and additional stages may be added to the Nth stage as desired and shown. The digital stage I is the same as the remaining stages except that there is no gate B' or "and-gate" AG, in this stage.

It is to be understood that double triode tubes may be substituted for the twin tubes shown in the various multivibrators circuits, where desired. It is also to be understood that the diodes herein illustrated in the gate circuits may be vacuum tube diodes, crystal diodes, or the like, as desired.

In the operation of the device shown and described in Figure 1 it is first necessary to understand the binary system of numbers. As shown in Figure 1, the digit of least significance is at the extreme right with the numbers of greater significance increasing as the digits progress to the left. The first digit in the binary system will be indicated by (1 or 0) $2^0$; the second digit next to the left is indicated by (1 or 0) $2'$; the third digit from the right in the binary system is indicated by (1 or 0) $2^2$; the fourth by (1 or 0) $2^3$, and so on through the binary digital system. Represented by the binary numbers the digits are either expressed by a one or a zero depending on whether the addend, carry, and augend register units are in the "1" state or the "0" state, respectively.

For example, if it is desired to add the decimal numbers 5 and 3, the binary number 0 1 0 1 will be placed in the addend register by tripping FF–A–1 and FF–A–3 to the "1" state through the keying device (not shown) coupled to terminals 14. The add pulse can pass through the gates $A_1$ and $A_3$ to put the augend register FF–B–1 and FF–B–3 in the "1" state. The gates C of all carry registers are closed thereby blocking the following delay pulse. The decimal number 3 to be added to the decimal number 5 will be placed in the addend register by tripping FF–A–1 and FF–A–2 to the "1" state. The add pulse can therefore pass through gates $A_1$ and $A_2$ to the augend register units FF–B–1 and FF–B–2. Since FF–B–1 is in the "1" state the gate circuit $B_1$ is open to pass the pulse to the carry unit CA–1 placing this carry unit in the "1" state. Simultaneously therewith the augend register FF–B–1 is changed to the "0" state. At the same time the add pulse is passed through the gate $A_2$ to place the augend register unit FF–B–2 in the "1" state. The following delay pulse can pass the gate $C_1$ since the carry unit CA is in the "1" state but the delay pulse is blocked in all the other C gates. The delay pulse passed through gate $C_1$ passes through the gate $B'_2$ since the augend register unit FF–B–2 is in the "1" state. The delay pulse passed through the gate $B'_2$ is applied to the "and-gate" AG–1. Since the augend register units FF–B–2 and FF–B–3 are still in the "1" state, the "and-gate" AG-1 is conditioned through conductor 48 and diode 50 and the conductor 49 and diode 51 to pass the pulse via conductor 53 to the augend register unit FF–B–4. The application of the add pulse to the common grid input of the augend register unit FF–B–2 changes this unit to the "0" state and at the same time changes the augend unit FF–B–3 to the "0" state through the gate $B'_2$ and conductor 43. This completes the addition of the decimal digits 5 and 3 wherein the carry register is clear and the augend register is clear except for FF–B–4 which is in the "1" state. This sets up the binary number of 1 0 0 0 which is the equivalent of 8 in the decimal system. A chart of the states of the registers in the above described operation is presented below for convenience in following through the problem.

| | IV | III | II | I |
|---|---|---|---|---|
| FF–A | 0 | 1 | 0 | 1=5 |
| (Add Pulse) | | | | |
| FF–B | 0 | 1 | 0 | 1 |
| CA | 0 | 0 | 0 | 0 |
| (Delay Pulse) | | | | |
| FF–B | 0 | 1 | 0 | 1 |
| FF–A | 0 | 0 | 1 | 1=3 |
| (Add Pulse) | | | | |
| FF–B (Partial Sum) | 0 | 1 | 1 | 0 |
| CA | 0 | 0 | 0 | 1 |
| (Delay Pulse) | | | | |
| FF–B (Sum) | 1 | 0 | 0 | 0=8 |

Other numbers may be added in the same manner by tripping the desired addend units to produce the binary number represented in the binary system to be added. The visual glow indicators 25 on each of the augend bi-stable multivibrator units indicate which of the augend units are in the "1" state. It may also be understood that addition may be accomplished by tripping either the addend multivibrators or the augend multivibrators, or both, where desirable. That is, the number 5 could have been pulsed in the addend register and the 3 in the augend register before the add and delay pulses are applied. The size of the numbers handled depends on the number of digital stages in the system.

Referring now to Figure 2, another modification of the binary digital adder is shown wherein the digital stages are arranged in vertical juxtaposed coupled relation as indicated by the numerals (1), (2), (3), and (4) shown at the top of the drawing. The addend, carry, and augend registers arranged horizontally across the circuit diagram have legends therefor to the right of the drawing as in Figure 1. Each addend, carry, and augend register in each digital stage is constructed substantially the same as the corresponding register in Figure 1 and therefore like reference characters representing like parts are shown herein and primed. The augend register units are shown to be in the "1" state by the glow tube 25' associated therewith as in Figure 1.

The output of the anode circuit of the tube 32' in the carry unit *ca*–1, for example, is connected by conductor 70 to a gate *g*–1 consisting of a resistor 71 coupled through a diode 72 and through a resistor 73 to a high voltage direct current source $E_H$. The anode of the tube 32' is also connected through conductor 76 to an "and-circuit" +1 consisting of two diodes 80 and 81 coupling them through a resistor 82 to the high voltage source $E_H$. The output of the gate, *g*–1, is coupled to the common grid input of the augend unit FF–*b*–2 through the conductor 75, the input to the gate *g*–1 being by a conductor 74 from the delay pulse circuit 58'. Whenever a carry digit exists in the carry unit *ca*–1 the gate *g*–1 will be opened to pass the delayed pulse to the common grid input of the augend register unit FF–*b*–2. The "and-circuit" +1 is coupled to the anode of the tube 22' in the augend unit FF–*b*–2. The output of the "and-circuit" +1 is connected to an "or-circuit" indicated by the principal reference character $OR_1$ The "or-circuit" consists of two diodes 83 and 84, the diode 83 being in the coupling from the "and-circuit" and the diode 84 being in a coupling to the anode of the tube 32' in the carrying unit *ca*–2.

The diodes 80 and 81 in the "and-circuit" +1 are arranged such that a high voltage from the anode of tube 32' in *ca*–1 accompanied by a high voltage from the anode of tube 22' in FF–*b*–2 will apply a high voltage on diode 83 which will open the gate *g*–2 to apply the delay pulse to the common grid input of FF–*b*–3. In the absence of a high voltage on the diode 83 a high voltage may be applied to diode 84 from the anode of tube 32' in *ca*–2 to open the gate *g*–2. The "and-circuit" and the "or-circuit" therefore cooperate to investigate the state of the instant carry unit and the carry unit from the preceding digital stage simultaneously. That is, the "and-circuit" +2 will investigate the state of the "or-circuit" OR, and the state of the anode of tube 22' in FF–*b*–3. If FF–*b*–3 is in the "1" state, the "and-circuit" +2 will condition the "or-circuit" $OR_2$ to pass the delay pulse through *g*–3 to FF–*b*–4. If FF–*b*–3 is in the "0" state, gate *g*–3 will only be opened where *ca*–3 is in its "1" state.

In the operation of the modification shown by Figure 2, let it be assumed that two decimal numbers 3 and 3 are to be added. The addend register is tripped by a key board, or the like (not shown) through the terminals 14' to place the addend register units FF–*a*–1 and FF–*a*–2 in the "1" state. The add pulse coming by way of conductor 56' and conductors 18' will place the augend units FF–*b*–1 and FF–*b*–2 in the "1" state. Their carry units will remain unchanged. The delay pulse will produce no further change in the condition of the addend or augend registers. The second decimal 3 to be added is placed in the addend register by again tripping the addend register units FF–*a*–1 and FF–*a*–2 to the "1" state. The add pulse will be effective to place all the augend register units in the "0" state. The carry register will now have the units *ca*–1 and *ca*–2 in the "1" state. The delayed pulse will thereafter place the augend register units FF–*b*–2 and FF–*b*–3 in the "1" state wherein the glow tubes 25' in these two units will glow while the glow tubes in the remaining units will be dark. This is the sum of decimal numbers 3 and 3, represented in the four digits of the binary digital adder by 0 1 1 0 which binary number is the equivalent of decimal number 6.

In order to better illustrate the function of the "and-circuits" and the "or-circuits" a decimal number 2 will be added to the sum of decimal 6 presently on the augend register. To condition the addend register to represent the decimal numeral 2 to be added, the addend unit FF–*a*–2 will be tripped to its "1" state. The add pulse coming by way of 56' and 18' finding the gate *a*–2 open by reason of FF–*a*–2 being in the "1" state will produce a "1" state in the unit *ca*–2 while all other carry units will remain in the "0" state since FF–*b*–2 was in the "1" state when the add pulse was applied. A subsequent delay pulse will cause the augend register unit FF–*b*–4 to go to its "1" state while the remaining augend register units will change to their "0" state. This is effected through the following process. When the add pulse is applied to add the decimal number 2 to the sum of 6, the carry unit *ca*–2 is put in the "1" state because FF–*b*–2 is in the "1" state. FF–*b*–2 thereafter changes to the "0" state. Since the carry unit *ca*–2 is in the "1" state the *g*-2 gate is opened by the $OR_1$ circuit (but not by reason of the "and-circuit" +1), and the delay pulse is passed through the gate *g*–2 to trip the augend register unit FF–*b*–3 to the "0" state. At the same time FF–*b*–3 is resting in the "1" state and the high voltage impressed from *ca*–2 or $OR_1$ and also on the "and-circuit" +2 will impress a high voltage on the $OR_2$ gate to open the gate *g*–3. The delay pulse is thereby applied to the augend register unit FF–*b*–4 putting it in the "1" state. The remaining OR and *g* gates are closed leaving the binary sum of 1 0 0 0 which is equivalent to the decimal number 8.

In order to better understand the function and operation of addition by the use of the binary digital adder shown in Figure 2 the following chart of the present illustration just given is presented.

| | (4) | (3) | (2) | (1) |
|---|---|---|---|---|
| FF-*a* | 0 | 0 | 1 | 1=3 |
| Add pulse | | | | |
| FF-*b* | 0 | 0 | 1 | 1 |
| *ca* | 0 | 0 | 0 | 0 |
| Delay pulse | | | | |
| FF-*b* | 0 | 0 | 1 | 1 |
| FF-*a* | 0 | 0 | 1 | 1=3 |
| Add pulse | | | | |
| FF-*b* (Partial Sum) | 0 | 0 | 0 | 0 |
| *ca* | 0 | 0 | 1 | 1 |
| Delay pulse | | | | |
| FF-*b* (Sum) | 0 | 1 | 1 | 0=6 |
| FF-*a* | 0 | 0 | 1 | 0=2 |
| Add pulse | | | | |
| FF-*b* (Partial Sum) | 0 | 1 | 0 | 0 |
| *ca* | 0 | 0 | 1 | 0 |
| Delay pulse | | | | |
| FF-*b* (Sum) | 1 | 0 | 0 | 0=8 |

It is to be understood that the binary digital adder as shown in Figure 2 may have numbers added by presenting them in either the addend register, or the augend register, or both, as desired. The steps presented in the addition to the examples given hereinabove are carried out very rapidly in this device. The augend register units are each designed to have a very slight delay in changing the condition of conduction in order that the gates controlled thereby will not be closed before the pulse flipping the augend register unit is passed through the gate. The monostable multivibrator carry units are designed to stay in their condition of conduction in tube 31' when tripped by a pulse on the grid of the tube 32 for only a period of time sufficient for the delay pulse to act. By increasing the number of digital stages, unlimited values can be added by the device shown.

While many modifications and changes may be made in the constructional details and features of this invention without departing from the spirit and scope thereof we desire to be limited only by the scope of the appended claims.

We claim:

1. An electrical circuit for adding binary numbers corresponding to decimal numbers comprising; a plurality of binary digital stages, each including an addend register unit, an augend register unit, and a carry register unit, each said register unit having two digital states, and means for controlling the digital state of said addend and augend register units representative of binary numbers; add pulse means coupling the digital stages in parallel by add pulse branch couplings, each add pulse branch coupling being to the augend and the carry register units in each digital stage in that sequence; means in each said add pulse branch coupling controlled by each addend register unit to block in one digital state and to pass in the other digital state an add pulse to the corresponding augend and carry register units, and second means in each add pulse branch coupling between said first-mentioned means and said carry register unit controlled by each augend register unit to block in one digital state and to pass in the other digital state the add pulse passed by said first-mentioned means to the corresponding carry register unit; delay pulse means, delayed in coincidence after each add pulse a predetermined short period of time, coupling the digital stages in parallel by delay pulse branch couplings to each augend register unit except that of least digital significance; and means in each delay pulse branch coupling controlled by said carry and said augend register units to block and to pass delay pulses of said delay pulse means to condition said augend register units in one and the other of said digital states producing a sum of binary digits in said augend register units added by the addend and augend register units.

2. A binary adder as set forth in claim 1 wherein said means to block and to pass the add pulses of said add pulse means and to block and to pass the delay pulses of said delay pulse means are gate circuits.

3. A binary adder as set forth in claim 1 wherein said addend and augend registers are bi-stable multivibrator circuits and said carry registers are monostable multivibrator circuits.

4. A binary adder as set forth in claim 3 wherein said means to block and to pass the add pulses of said add pulse means and to block and to pass the delay pulses of said delay pulse means are gate circuits.

5. A binary adder as set forth in claim 4 wherein the gates controlled cooperatively by said carry and said augend register units are "and-gates" wherein both carry and augend register units must be in the same one digital state to pass and in the same other digital state to block said delay pulses.

6. An electrical circuit for adding binary numbers comprising: a plurality of binary digital stages each including an addend register unit, an augend register unit, and a carry register unit, each register unit having a binary "0" state and a binary "1" state; means for selectively conditioning each addend and augend register unit of each stage in either state; means for applying an add pulse in parallel to all stages through branch conductors to the augend and carry register units in series; means in each branch conductor coupled to each addend registed unit for blocking said add pulse to said augend and carry register units when said addend register unit is in the "0" state and for passing said add pulse when said addend register unit is in said "1" state; means in each branch conductor coupled to each augend register unit for blocking said add pulse to said carry register unit when said augend register unit is in said "0" state and for passing said add pulse when said augend register unit is in said "1" state; means for applying a delay pulse in parallel to all stages through branch conductors to each augend register unit except the augend register unit of least digital significance; means in said last-mentioned branch conductor coupled to each carry register unit for blocking said delay pulse to the augend registers representative of higher order binary digits when said carry register unit is in said "0" state and for passing said delay pulse when said carry register unit is in said "1" state; and means coupled to each last-mentioned branch conductor and to each said augend register unit representing binary digits other than that of the least digital significance to pass said delay pulse on to the next first augend register unit resting in said "0" state whereby said augend register units of all said stages represents the sum of binary numbers added.

7. A binary adder device as set forth in claim 6 wherein said means coupled to each last-mentioned branch conductor and to each said augend register unit to pass said delay pulse on to the next augend register unit resting in the "0" state is a gate circuit and and-gate circuits connected in series, said and-gates each coupled to the augend register unit of the same stage and to the augend register unit of the next higher digital stage whereby a delay pulse passing said gate circuit will pass through said and-gates to the first augend register unit resting in the "0" state to change it to the "1" state.

8. A binary adder device as set forth in claim 6 wherein said means coupled to each last-mentioned branch conductor and to each said augend register unit to pass said delay pulse on to the next augend register unit resting in the "0" state is a gate coupled to and controlled by a combination of and-circuits, and or-circuits, except in the stage of least digital significance the and-circuit being coupled to respond to the augend register unit of the present stage and the or-circuit of the preceding stage and the or-circuit being coupled to respond to the carry register unit of the present stage and the and-circuit of the present stage, said gate being able to pass said delay pulse under two conditions, one of which exists when the carry register unit of the prior stage and the augend register unit of the instant stage are both in the "1" state impressing a voltage on said and-circuit and in the other condition when the carry register unit of the instant stage is in the "1" state impressing a voltage on said or-circuit.

References Cited in the file of this patent

UNITED STATES PATENTS

| | | |
|---|---|---|
| 2,634,052 | Bloch | Apr. 7, 1953 |

| | | |
|---|---|---|
| 2,700,504 | Thomas | Jan. 25, 1955 |
| 2,719,670 | Jacobs et al. | Oct. 4, 1955 |

OTHER REFERENCES

"24-Digit Parallel Computer with Magnetic Drum Memory," E. R. A., Feb. 15, 1949, pages 31–33 and Figures 3.4–2 and 3.4–4.

"A Digital Computer for Scientific Applications," West and DeTurk; Proc. of IRE, Dec. 1948, pages 1452 to 1457.